United States Patent [19]

Ono

[11] Patent Number: 4,484,129
[45] Date of Patent: Nov. 20, 1984

[54] SPEED CONTROL APPARATUS FOR POLYPHASE INDUCTION MOTORS

[75] Inventor: Tadahiro Ono, Shizuoka, Japan

[73] Assignees: Toshiba Kikai Kabushiki Kaisha; Toei Denki Kabushiki Kaisha, both of Tokyo, Japan

[21] Appl. No.: 551,140

[22] Filed: Nov. 14, 1983

[30] Foreign Application Priority Data

Nov. 15, 1982 [JP] Japan .................. 57-200082

[51] Int. Cl.$^3$ .............................................. H02P 5/40
[52] U.S. Cl. .................................. 318/807; 318/798; 318/806; 318/801
[58] Field of Search .............. 318/798, 806, 803, 811

[56] References Cited

U.S. PATENT DOCUMENTS 4,357,569 11/1982 Iwakane et al. .................. 318/798
4,358,726 11/1982 Iwakane et al. .................. 318/798

Primary Examiner—David Smith, Jr.
Attorney, Agent, or Firm—Koda and Androlia

[57] ABSTRACT

In a speed control system of a three phase induction motor, a resolver is connected to the rotor of the motor for producing a phase modulated signal $E\sin(\omega t + \theta)$ containing the rotational angle $\theta$. This signal is converted into a speed signal $K_2 E(d\theta/dt)$ which is compared with a speed instruction signal to produce an error signal. The error signal is multiplied with the phase modulated signal and the product is rectified with three synchronous rectifier units respectively controlled by three reference signals having phase differences of 0, $2\pi/3$ and $4\pi/3$ for producing three phase voltages applied to the stator winding of the induction motor. The control system enables to control the speed while maintaining the slip frequency at a constant value.

5 Claims, 2 Drawing Figures

SPEED CONTROL APPARATUS FOR POLYPHASE INDUCTION MOTORS

BACKGROUND OF THE INVENTION

This invention relates to speed control apparatus of a polyphase induction motor, while maintaining the slip frequency at a constant value.

In order to control the speed of an induction motor while maintaining the slip frequency at a constant value, it has been the practice to use a tachometer generator as a speed detector for producing a speed signal and a primary frequency signal of the motor. However, since a tachometer generator cannot detect the angular position of the rotor, it is necessary to add some means for detecting the angular position of the motor to provide an efficient speed control.

SUMMARY OF THE INVENTION

It is an object of this invention to provide speed control apparatus of a polyphase induction motor capable of controlling the speed thereof while maintaining the slip frequency at a constant value by utilizing a detector producing a phase modified signal such as a resolver usually utilized for effecting position feedback of the motor instead of a tachometer generator.

According to this invention there is provided speed control apparatus of a polyphase induction motor comprising means driven by the output shaft of the induction motor for generating a phase modulated signal $E \sin(\omega t + \theta)$ where $\theta$ represents a rotational angle of the output shaft and $E$ a voltage; speed signal converting means for forming a signal $K_2 E (d\theta/dt)$ from the phase modulated signal wherein $K_2$ represents a constant; speed instruction signal generating means producing a speed instruction signal $V_{ref}$ corresponding to a rotational speed of the motor; an adder for obtaining an error signal corresponding to a difference between the speed instruction signal and the output of the speed signal converting means; a multiplier which multiplies the error signal with the phase modified signal; slip frequency generating means for generating a slip frequency corresponding to a characteristic of the motor; adder/substractor means effecting addition or subtraction operation of the slip frequency and the carrier frequency $\omega/2\pi$ in accordance with the error signal; means for converting the output of the adder/subtractor means into a plurality of reference signals having predetermined phase differences; synchronous rectifying means rectifying the output of the multiplier in accordance with the reference signals for producing polyphase voltages; and means for applying the polyphase voltages to respective phase windings of the induction motor.

In the case of a three phase induction motor, it is advantageous to use a counter for converting the output of the adder/subtractor means into three reference signals having phase differences of 0, $2\pi/3$ and $4\pi/3$ respectively, and the synchronous rectifying means comprises three rectifying units respectively rectifying the output of the multiplier in accordance with three reference signals for producing three phase voltages.

DESCRIPTION OF THE PREFERRED EMBODIMENT

Figure 1:
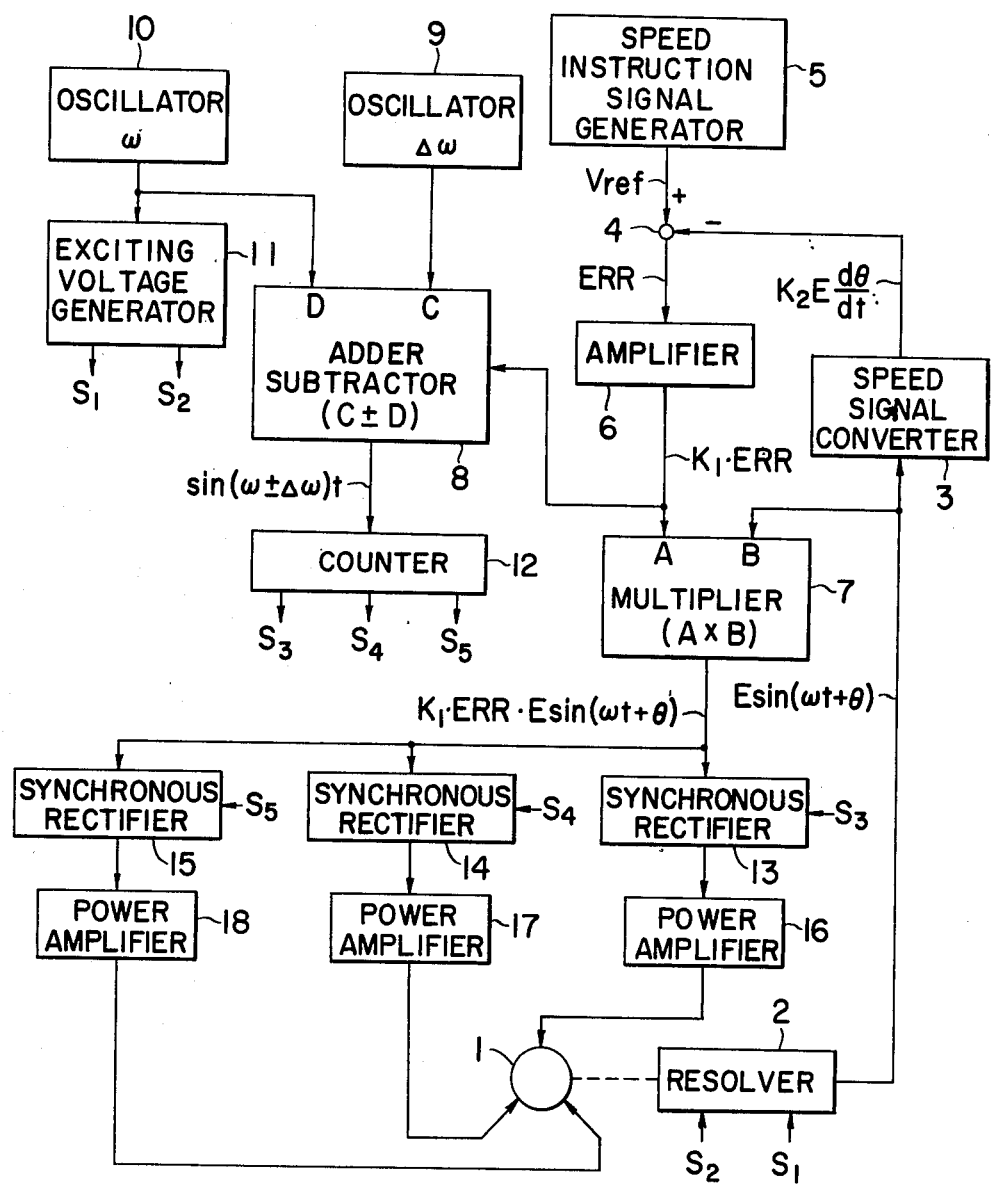
FIG. 1 is a block diagram showing one embodiment of the speed control apparatus according to this invention.

Referring now to FIG. 1 of the accompanying drawings, the rotor of a phase modulated signal generator 2, in this example a resolver, capable of producing a signal, including the rotational angle $\theta$ of the output shaft of a polyphase induction motor 1 is coupled to the output shaft. Two stationary primary windings of the resolver are supplied with 90° dephased rectangular or sinusoidal exciting voltage signals $S_1$ and $S_2$ from an exciting voltage generator 11. While the exciting voltage signals $S_1$ and $S_2$ are being applied when the output shaft of the motor 1 is rotated, a phase modulated signal $E \sin(\omega t + \theta)$ containing the rotational angle $\theta$ of the motor output shaft will be induced in the secondary winding on the rotor. The phase modulated signal $E \sin(\omega t + \theta)$ is sent to a speed signal converter 3 to be converted into a signal corresponding to the time differential of the rotational angle $\theta$, that is a speed signal.

Figure 2:
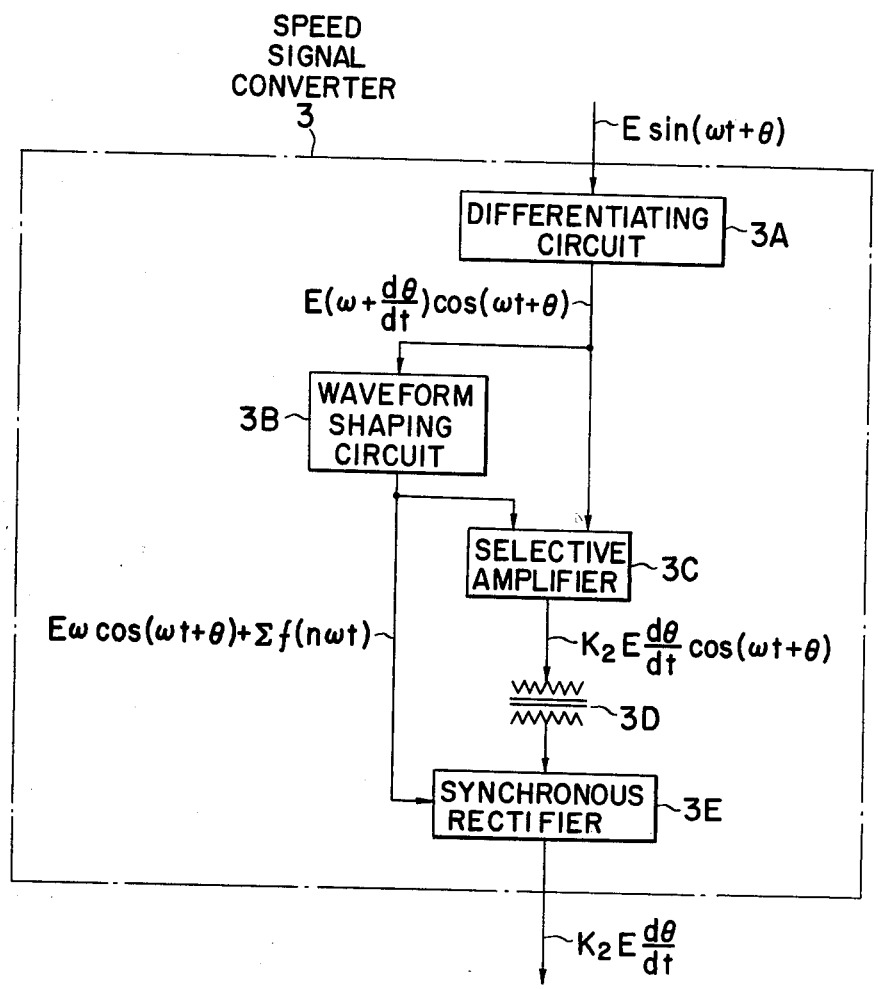
FIG. 2 is a block diagram showing the detail of the speed signal converter 3 shown in FIG. 1.

As shown in FIG. 2, the speed signal converter 3 comprises a differentiating circuit 3A, a waveform shaping circuit 3B, a selective amplifier 3C, a transformer 3D and a synchronous rectifier 3E. The phase modulated signal $E \sin(\omega t + \theta)$ is firstly applied to the differentiating circuit 3A and its output $$E(\omega + [d\theta/dt]) \cos(\omega t + \theta)$$

is applied to the waveform shaping circuit 3B and the selective amplifier 3C. The waveform shaping circuit 3B converts the differentiated output into a rectangular waveform which is expressed by Fourier series $$E \omega \cos(\omega t + \theta) + \Sigma f(n\omega t)$$

The selective amplifier 3C amplifies a component regarding the fundamental frequency $(\omega/2\pi)$ of a difference between the differentiated output and the output from the waveform shaping circuit 3B. Thus, the difference is expressed by $$[E \omega \cos(\omega t + \theta) + E(d\theta/dt) \cos(\omega t + \theta)] - [E \omega \cos(\omega t + \theta) + \Sigma f(n\omega t)] = E(d\theta/dt) \cos(\omega t + \theta) - \Sigma f(n\omega t)$$

Of this difference, only the component regarding the fundamental frequency $(\omega/2\pi)$ is multiplied by a factor of $K_2$. Thus, the output of the selective amplifier 3C is expressed by $$K_2 E(d\theta/dt) \cos(\omega t + \theta)$$

This output is supplied to the synchronous rectifier 3E through transformer 3D so that the output of the waveform shaping circuit 3B is synchronously rectified as a reference signal. As a consequence, the output of the synchronous rectifier 3E is expressed by $K_2 E(d\theta/dt)$ and applied to an adder 4 shown in FIG. 1. The adder 4 calculates a difference (hereinafter termed as error signal ERR) between the output $K_2 E(d\theta/dt)$ of the speed signal converter 3 and an instruction voltage $V_{ref}$ given from a speed instruction signal generator 5 and corresponding to the number of revolutions of the motor 1. The error signal ERR is amplified by an amplifier 6 by a factor of $K_1$, and the output $K_1 \cdot ERR$ of amplifier 6 is applied to one input terminal A of a multiplier 7 and to one input terminal of an adder/subtractor 8. The other input terminal B of multiplier 7 is supplied with the phase modulated signal E sin ($\omega t+\theta$) produced by the resolver 2. Consequently, the output of the multiplier 7 is given by an equation $$K_1 \cdot ERR \cdot E \sin(\omega t+\theta) = E \cdot K_1(V_{ref} - K_2 \cdot E[d\theta/dt]) \sin(\omega t+\theta)$$

The adder/multiplier 8 is supplied with a signal giving a slip frequency $\Delta\omega/2\pi$ from a first oscillator 9, and a signal giving a carrier frequency $\omega/2\pi$ of the phase modulated signal from a second oscillator 10. The adder/subtractor 8 adds or subtracts the signal from the first oscillator 9 to and from the signal from the second oscillator 10 depending upon a positive or negative output of the amplifier 6. The output sin ($\omega \pm \Delta\omega$)t of the adder/subtractor is converted into three rectangular waveform signals $S_3$, $S_4$ and $S_5$ having phase differences of 0, $2\pi/3$ and $4\pi/3$ by a counter 12.

The output of the multiplier 7 is sent to three synchronous rectifier units 13, 14 and 15 which synchronously rectify the output of the multiplier 7 respectively in accordance with the output signals $S_3$, $S_4$ and $S_5$ of the counter 12. The outputs of the synchronous rectifier units 13, 14 and 15 supplied to the U, V, W phase windings of the motor 1 respectively through power amplifiers 16, 17 and 18.

Thus, according to this invention, a phase modulated signal E sin ($\omega t+\theta$) produced by a resolver 2 and containing a rotational angle $\theta$ of the output shaft of a motor 1 is converted into a speed signal by a speed signal converter 3, a difference (error signal) between the speed signal $K_2 \cdot E(d\theta/dt)$ and an instruction voltage $V_{ref}$ corresponding to an instructed rotational speed is calculated, the product of the error signal ERR and the phase modulated signal is rectified synchronously by utilizing signals $S_3$, $S_4$ and $S_5$ having a phase difference of $2\pi/3$ as reference signals and signals thus rectified are supplied to respective phase windings of the motor through respective power amplifiers 16, 17 and 18 so that the speed of the motor can be controlled as desired while maintaining the slip frequency at a constant value.

Especially, as a detector for detecting the speed of the motor is used a resolver 2 which produces a position signal and a speed signal so that the speed control can be made at a high accuracy.

Although in the foregoing embodiment a resolver was used as means for generating a phase modulated signal, where the phase modulated signal is derived out through a movable body moved rectilinearly by an induction motor, for example, an Inductsyn (registered trade mark) may be used as the detector. Furthermore, although the speed signal converter 3 was shown and described as of an analogue processing type it can be constructed such that the rotational angle $\theta$ is derived out with a digital processing system and then differentiating $\theta$.

As above described, according to this invention instead of utilizing a tachometer generator, a phase modulated signal can be produced by a resolver which is often used for position feedback so that it is possible to accurately control the speed of an induction motor while maintaining its slip frequency at a constant value with a simple construction.

I claim:

1. Speed control apparatus of a polyphase induction motor comprising:
    means driven by an output shaft of said induction motor for generating a phase modulated signal E sin ($\omega t+\theta$) where $\theta$ represents a rotational angle of said output shaft and E a voltage;
    speed signal converting means for forming a signal $K_2 E(d\theta/dt)$ from said phase modulated signal, wherein $K_2$ represents a constant;
    speed instruction signal generating means producing a speed instruction signal $V_{ref}$ corresponding to a rotational speed of said motor;
    an adder for obtaining an error signal corresponding to a difference between said speed instruction signal and an output of said speed signal converting means;
    a multiplier which multiplies said error signal with said phase modified signal;
    slip frequency generating means for generating a slip frequency corresponding to a characteristic of said motor;
    adder/subtractor means for effecting addition or substraction operation of said slip frequency and said carrier frequency $\omega/2\pi$ in accordance with said error signal;
    means for converting an output of said adder/subtractor means into a plurality of reference signals having predetermined phase differences;
    synchronous rectifying means rectifying an output of said multiplier in accordance with reference signals for producing polyphase voltages; and
    means for applying said polyphase voltages to respective phase windings of said induction motor.

2. The speed control apparatus according to claim 1 wherein said means for converting said output of said adder/subtractor means comprises a counter producing three reference signals having phase differences of 0, $2\pi/3$ and $4\pi/3$ respectively.

3. The speed control device according to claim 2 wherein said synchronous rectifying means comprises three synchronous rectifier units respectively controlled by said three reference signals for producing three phase voltages applied to said induction motor.

4. The speed control apparatus according to claim 1 wherein said means for generating said phase modulated signal comprises a resolver.

5. The speed control apparatus according to claim 1 wherein said speed signal converting means comprises a differentiating circuit for differentiating said phase modulated signal E sin ($\omega t+\theta$), a waveform shaping circuit for shaping an output of said differentiating circuit into a rectangular waveform, a selective amplifier for selectively amplifying outputs of said differentiating circuit and said waveform shaping circuit, and a synchronous rectifier for rectifying an output of said selective amplifier in accordance with an output of said waveform shaping circuit for producing said signal $K_2 E(d\theta/dt)$.

* * * * *